United States Patent [19]

Lewis

[11] 4,319,242
[45] Mar. 9, 1982

[54] INTEGRATED WEAPON CONTROL RADAR SYSTEM

[75] Inventor: Bernard L. Lewis, Oxon Hill, Md.

[73] Assignee: The United States of America as represented by the Secretary of the Navy, Washington, D.C.

[21] Appl. No.: 127,014

[22] Filed: Mar. 4, 1980

[51] Int. Cl.³ .............................................. G01S 13/87
[52] U.S. Cl. ................................ 343/6 R; 343/16 M; 343/876
[58] Field of Search ..................... 343/6 R, 16 M, 876

[56] References Cited

U.S. PATENT DOCUMENTS

| | | | |
|---|---|---|---|
| 3,095,538 | 6/1963 | Silberstein | 343/876 X |
| 3,378,835 | 4/1968 | Mooney, Jr. et al. | 343/5 R |
| 3,710,382 | 1/1973 | Allen | 343/876 X |
| 3,827,049 | 7/1974 | Van Staaden et al. | 343/16 M X |
| 3,949,396 | 4/1976 | Cantrell | 343/6 R X |
| 4,257,047 | 3/1981 | Lipsky | 343/16 M X |

Primary Examiner—T. H. Tubbesing
Attorney, Agent, or Firm—Robert F. Beers; William T. Ellis; Vincent J. Ranucci

[57] ABSTRACT

A system for integrating weapon control radars which operate at the same or different frequency bands, and for permitting every weapon control radar, for example on a ship, to lock through every weapon control antenna, thereby enabling all radars to be used against all targets, includes interconnecting broad-band antennas that can be time - and/or frequency-shared by all the radars. Each antenna has a coaxial monopulse feed at the various bands of operation. Each antenna also includes a switch for time-sharing the radars either simultaneously or sequentially into the antenna. A second switch for each antenna sends the radar outputs associated with each antenna to a control system for that antenna and its associated weapon launcher.

4 Claims, 4 Drawing Figures

INTEGRATED WEAPON CONTROL RADAR SYSTEM

BACKGROUND OF THE INVENTION

The invention relates generally to integrated communication systems and more particularly to a system for integrating a plurality of weapon control radars which may be used against all targets.

Most naval fighting vessels have several weapon control radars, each radar having its own antenna, and the radars together occupy more than one frequency band. However, each radar with its associated antenna is dedicated to a separate single target and no provisions are made for augmenting one radar with another in difficult situations. That is, existing weapon control systems include N radars and N antennas, each antenna and its associated radar tracking a separate target. Thus, the loss of a weapon control radar antenna results in the loss of the associated radar system. Also, a radar may operate over a frequency band that may cause elevation lobing nulls in a low angle region so that a target becomes undetectable by that radar while the target is in that region.

Weapon control radars drastically over-sample targets, i.e., the data rate is much higher than necessary. For example, most weapon control radars employ a pulse repitition rate of approximately 1 KHZ whereas the weapon control systems require data at only about 10 HZ. The present invention exploits the high data-rate to increase the number of tracked targets at a lower data-rate per target by time-sharing the radars among the antennas, so that N antennas track N targets and each radar tracks all the targets. Thus, a radar may track many more targets than is presently allowable.

Significant advantages have been achieved by integrating surveillance radars with an integrated automatic detector and track (IADT) system. An IADT system requires that each radar in its system illuminates all the targets, which is a feature of surveillance radars. Therefore, an IADT system is not applicable to weapon control radars, because each weapon control radar looks at a different target.

SUMMARY OF THE INVENTION

It is the general purpose and object of the present invention to integrate a plurality of weapon control radars.

Another object is to permit each radar to obtain information on all targets.

Still another object is to apply an increased bandwidth and greater transmitter power to all tracked targets.

A further object is to prevent the loss of a complete radar system in the event of damage to one antenna.

A still further object is to increase tracking accuracy and fill elevation lobing nulls in the low angle region.

These and other objects of the present invention are accomplished by replacing the multiple single-band, single-radar antennas with an equal number of broadband antennas which can be time-and/or frequency-shared by all the radars. Thus, every radar system can track every target to which an antenna has been devoted.

The advantages of the present invention over prior art weapon control radar systems are:

Every tracked target is tracked by all the radars; in order to defeat the present invention, an enemy must operate in all bands employed by the invention, not just a single radar band; the effective radar power which is transmitted to each target is increased to burn through countermeasures because more than one radar may track a target through a common antenna; wideband frequency diversity is obtained for reducing target tracking errors, fades, and multipath problems; radar bands and complete systems are not lost if one or more antennas are destroyed; and, if mirror track antennas are employed under computer control, many targets can be tracked (by time-sharing) by a single antenna and all the radars, thereby greatly increasing the number of targets that could be accommodated by a weapons control system.

Other objects and advantages of the invention will become apparent from the following detailed description of the invention when considered in conjunction with the accompanying drawing wherein:

DETAILED DESCRIPTION OF THE INVENTION

Figure 1:
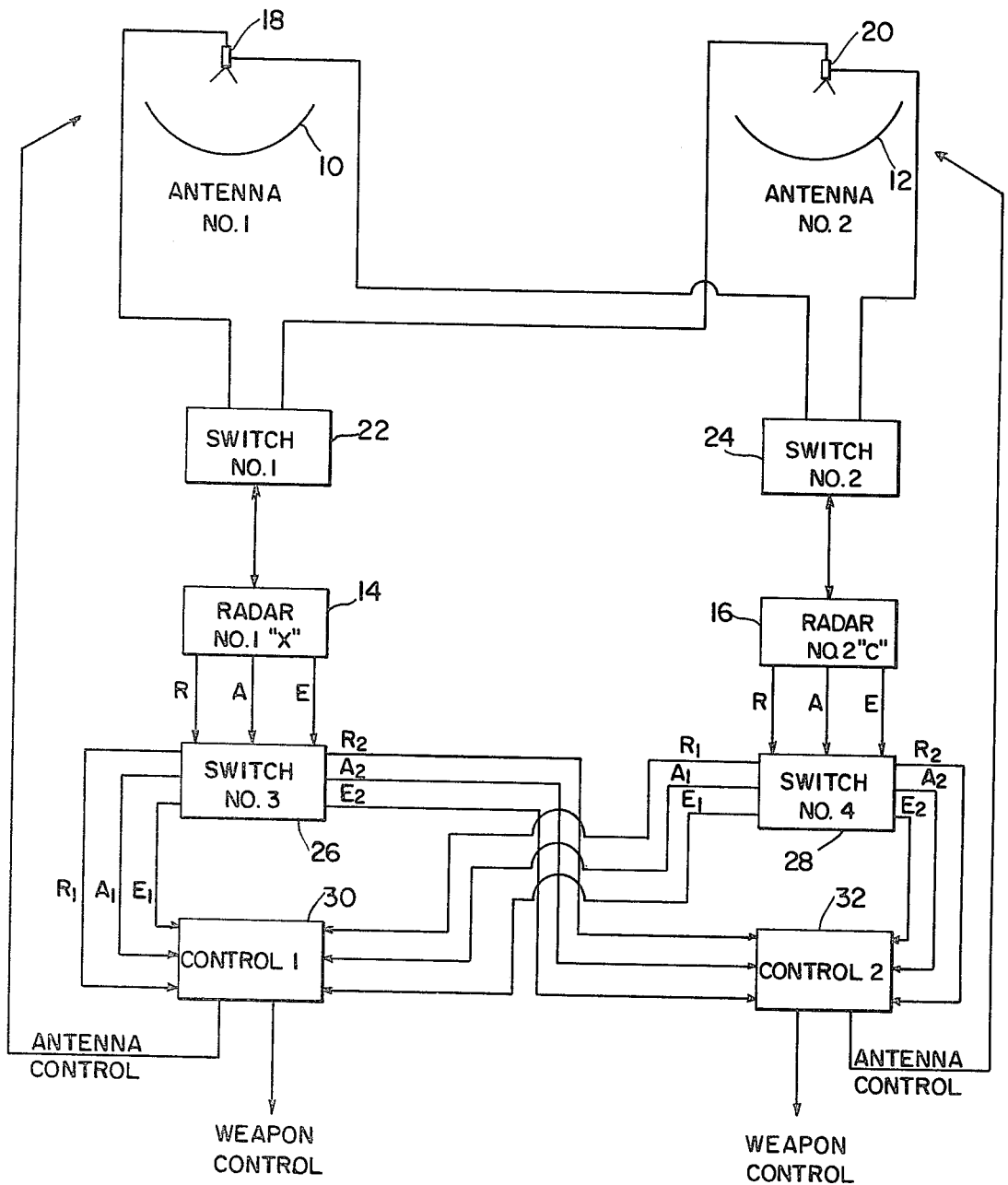
FIG. 1 is a block diagram of the invention showing two wideband tracking antennas having coaxial monopulse feeds at C and X frequency bands.

Referring now to the drawing, FIG. 1 shows a configuration which comprises the present invention. The configuration shows two antennas 10 and 12 and two weapon control radars 14 and 16 for illustrative purposes, but any number of antennas may be used with any number of radars depending on the degree of weapon control which is desired. Typically, five or six radars may be used with an equal or greater number of antennas.

Preferably, each antenna is sufficiently broadband so that many bands, X and C for example in FIG. 1, may be multiplexed into it. That is, each antenna should be operational over a bandwidth which is equal to or greater than the combined bandwidth of the radars. Such an antenna, for example, is a broadband, unipolar-parabola, movable half-plate (twist reflector), that is, a mirror-scanned antenna, which can typically look at approximately seven targets per second. A mirror scanned antenna will be discussed more fully hereinafter.

A monopulse feed and monopulse radar is preferable for use with the present invention because the range, elevation and azimuth signals of such radars are available on a single pulse and, therefore, the signals are independent of any amplitude modulation on another receive signal from a target. Thus, a monopulse radar takes a shorter time to sample a target and may be time-shared with more antennas and more targets for a given data rate. However, other radars, such as conical scan and lobe-on-receive-only, may be used.

Each antenna, as shown in FIG. 1, has a feed 18 and 20 at X and C bands. Other desirable bands, for example S or K bands, may be added. An X-band and a C-band radar system, 14 and 16 respectively, are each time-shared simultaneously or sequentially into the antennas by feed switches 22 and 24 so that each radar spends half its time with each antenna. If more radars comprise the system each radar would spend correspondingly less time with each antenna, i.e., each of three radars spends one-third of its time with each antenna, etc. Switches 26 and 28 de-commutate the radar video outputs (where R=range, A=azimuth, and E=elevation) and send those outputs associated with each antenna 10 and 12 to a control system, 30 and 32 respectively, for that antenna and the weapon launcher associated with the antenna.

Each control system may synchronize the radar transmissions and operate on the sum of the video signals with its range and angle error detectors. Alternatively, each control system may use data from the radars sequentially, or it may use an average of data from the radars, or the control system can choose the radar data with the highest signal-to-noise ratio. Preferably, however, a computer may be used rather than a number of control systems. The computer, therefore, would control the antennas and weapon launchers.

Figure 2:
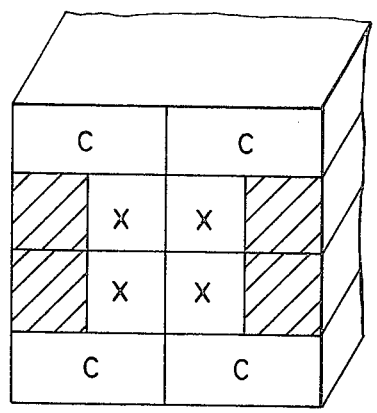
FIG. 2 illustrates a coaxial monopulse feed, for use with the antennas shown in FIG. 1, for simultaneous operation at C and X bands.

FIG. 2 is an example of a conventional four-horn coaxial monopulse feed for simultaneous operation at X and C band.

Figure 3:
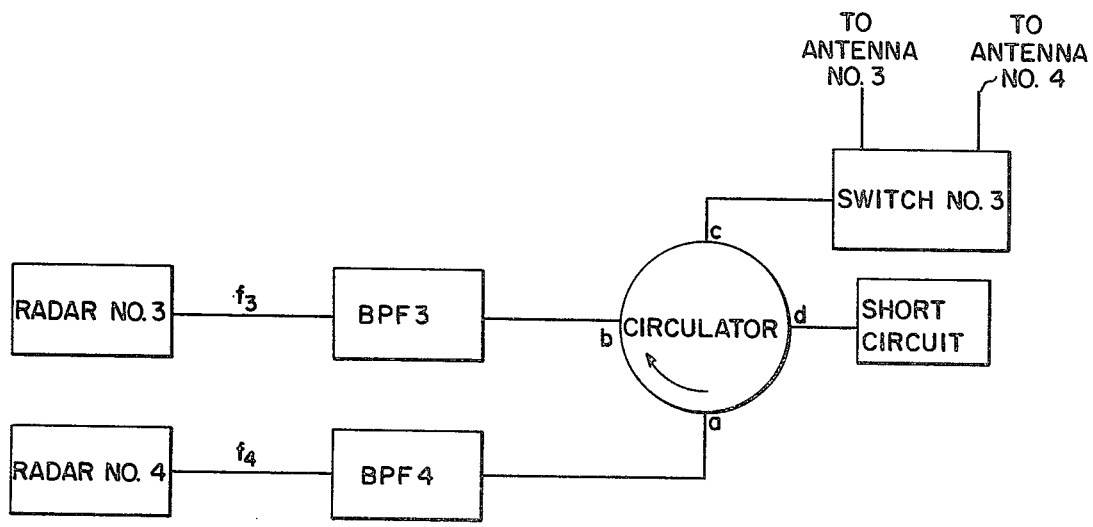
FIG. 3 is a block diagram of a diplexer for use with the invention if two or more radars are in the same frequency band.

FIG. 1 illustrates two radars, each operating at a different frequency band. However, if two or more radars, which operate at different frequencies but in the same frequency band, are used with the present invention, the radars may be multiplexed into that band feed by means of band pass filters and circulators, for example, as shown in FIG. 3. Radar No. 3, which transmits at frequency $F_3$, excites a band pass filter, BPF3, which excites port b of a four port circulator. The energy exits from port c of the circulator and goes to a feed switch. Radar No. 4 transmits energy at frequency $f_4$, $f_4$ being different from $f_3$ but in the same frequency band as $f_3$, through band pass filter BPF4 and into port a of the circulator. This energy at $f_4$ exits from port b, reflects off BPF3 and re-enters port b to exit from port c to the feed switch. In the receive mode, energy at $f_3$ enters port c, exits from port d, reflects from a short circuit, re-enters port d, exits from port a, reflects off BPF4, re-enters port a, exits from port b, passes through BPF3 to the receiver of radar No. 3. Also in the receive mode, $f_4$ enters port c, exits from port d, reflects off the short circuit, re-enters port d, exits from port a, passes through BPF4 to the receiver of radar No. 4. In the circulator system shown in FIG. 3, the short circuit on port d may be replaced by a third band pass filter, which passes frequency $f_5$, for accommodating a third radar that operates at $f_5$ in the same frequency band as radars Nos. 3 and 4. Alternatively, the short circuit may be replaced by a feed line from another circulator system which is connected to other radars.

Figure 4:
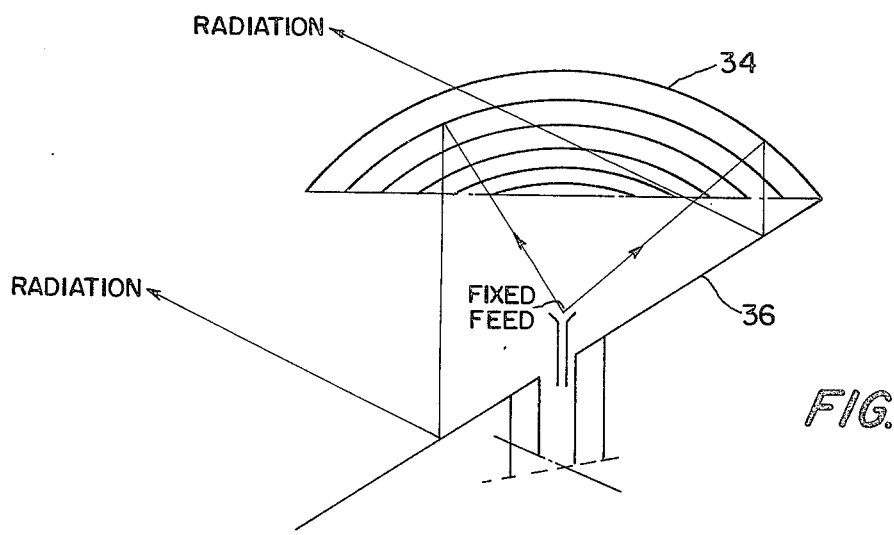
FIG. 4 illustrates an ideal antenna for use with the invention.

FIG. 4 illustrates an existing ideal antenna (mirror scanned antenna) for use with the present invention. Such an antenna is described in U.S. Pat. No. 3,916,416 by Bernard L. Lewis. The antenna includes a parabolic reflector 34 which comprises separate parallel wires that are embedded in a foam-filled fiberglass structure. The parabolic reflector 34 is fed by a fixed coaxial multiple frequency monopulse feed on the optical axis of the parabola. The feed is linearly polarized parallel to the wires in the parabola. Radiation which is collimated by the parabola strikes a broad-band half-wave-plate flat reflector 36 that may be moved for steering the beam of radiation without moving the feed or parabola. This half-wave-plate reflector rotates the plane of polarization of any incident radiation through ninety degrees so that the radiation passes through the wires which form the parabolic reflector. Such half-wave-plates have been developed for covering a frequency range of 10 to 1 by using log-periodic techniques, and have accommodated simultaneously multiple search radar systems operating in different frequency bands.

Mirror scanned antennas have a tracking bandwidth which is wide enough for time-sharing an antenna with up to six targets and providing a one-second data-rate on each target. Thus, two such antennas could provide a one-second data-rate on twelve targets, or 0.5 second data-rate on six targets at all available radar frequencies.

Obviously many more modifications and variations of the present invention are possible in light of the above teachings. It is therefore to be understood that within the scope of the appended claims the invention may be practiced otherwise than as specifically described.

I claim:

1. A system for integrating a plurality of weapon control radars, which radars may operate at different frequency bands, said radars for tracking a target and providing information for locating the target to a weapon launcher, such that all said radars may track a plurality of said targets, comprising:

broadband unipolar-parabola movable half-plate type antennas operational over a bandwidth comprising the frequency bands of said radars for transmitting signals of said radars and receiving return signals from said target;

means for controlling each antenna and weapon launcher to track and attack, respectively, the target;

first switching means for coupling a said radar to each antenna, said radar being time-shared with each antenna;

second switching means for coupling a said radar to said controlling means, said second switching means receiving range, azimuth, and elevation output signals from said radar and providing said output signals to the controlling means.

2. A system for integrating a plurality of weapon control radars and the antennas and weapon launchers associated therewith in order to provide tracking information for the target being tracked by each weapon control radar over a plurality of different frequency bands and from a plurality of different antennas comprising:

a plurality of weapon control radar systems operable over different frequency bands, each capable of tracking and providing information for locating a specific target;

a plurality of broadband antennas for transmitting and receiving broadband signals, each antenna associated with a specific weapon launcher to form an antenna and launcher pair for a given weapon control radar system;

first switching means for coupling each of said plurality of radar systems to each of said plurality of antennas such that the individual frequency band output signals from a given radar system tracking a specific target are transmitted through each of said plurality of antennas and return signals are received by said antennas and processed by said radars in their respective frequency bands for said specific target;

a plurality of control circuits, one for each antennas and weapon launcher pair, for controlling each antenna and weapon launcher to track and attack, respectively, a specific target; and second switching means for coupling the return signal range, azimuth, and elevation information for said specific target from each of said radar systems to the control circuit controlling the antenna and weapon launcher pair tracking that specific target.

3. A system as defined in claim 2, wherein said weapon control radars are monopulse radars and wherein each of said plurality of antennas has a monopulse feed at the various bands of radar operation.

4. A system as defined in claims 2 or 3, wherein said broadband antennas are broadband, unipolar-parabola, movable half-plate antennas.

* * * * *